US010240795B2

(12) United States Patent
Buchanan et al.

(10) Patent No.: US 10,240,795 B2
(45) Date of Patent: Mar. 26, 2019

(54) PILOT BURNER HAVING BURNER FACE WITH RADIALLY OFFSET RECESS

(71) Applicant: Siemens Aktiengesellschaft, Munich (DE)

(72) Inventors: Eoghan Buchanan, Lincoln (GB); Suresh Sadasivuni, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 222 days.

(21) Appl. No.: 15/113,429

(22) PCT Filed: Jan. 6, 2015

(86) PCT No.: PCT/EP2015/050104
§ 371 (c)(1),
(2) Date: Jul. 21, 2016

(87) PCT Pub. No.: WO2015/117775
PCT Pub. Date: Aug. 13, 2015

(65) Prior Publication Data
US 2017/0009994 A1   Jan. 12, 2017

(30) Foreign Application Priority Data
Feb. 6, 2014   (EP) .................................... 14154207

(51) Int. Cl.
*F23R 3/28*   (2006.01)
*F02C 7/264*  (2006.01)
(Continued)

(52) U.S. Cl.
CPC .............. *F23R 3/286* (2013.01); *F02C 7/264* (2013.01); *F23C 7/004* (2013.01); *F23Q 3/008* (2013.01);
(Continued)

(58) Field of Classification Search
CPC .. F23R 3/14; F23R 3/343; F23R 3/286; F23R 3/12; F23R 2900/00014;
(Continued)

(56) References Cited

U.S. PATENT DOCUMENTS 3,811,278 A * 5/1974 Taylor ....................... F23R 3/28
                                                                60/743
5,249,955 A * 10/1993 Kuhn ....................... F02C 7/266
                                                               431/173
(Continued)

FOREIGN PATENT DOCUMENTS

CN          1078789 A     11/1993
CN          1107933 A      9/1995
(Continued)

OTHER PUBLICATIONS

CN Office Action dated Apr. 1, 2017, for CN patent application No. 201580006820.4.

*Primary Examiner* — Gerald L Sung
*Assistant Examiner* — Alain Chau
(74) *Attorney, Agent, or Firm* — Beusse Wolter Sanks & Maire

(57) ABSTRACT

A burner includes a pilot burner, a combustion chamber, and a swirler located radially outwardly of the combustion chamber and being adapted to impose a swirling motion on a fuel/air mixture about an axial centerline of the combustion chamber. The pilot burner has a pilot burner face located radially inwardly of the swirler and forms an axially upstream wall of the combustion chamber, the pilot burner face incorporating a pilot fuel injector and an ignitor, both being positioned radially offset from the axial centerline. A recess is positioned radially offset from the axial centerline within the pilot burner face.

13 Claims, 4 Drawing Sheets

(51) Int. Cl.
  *F23Q 3/00* (2006.01)
  *F23C 7/00* (2006.01)
  *F23R 3/14* (2006.01)
  *F23R 3/34* (2006.01)

(52) U.S. Cl.
  CPC ............... *F23R 3/14* (2013.01); *F23R 3/343* (2013.01); *F05D 2220/32* (2013.01); *F05D 2240/35* (2013.01); *F23C 2900/07001* (2013.01)

(58) Field of Classification Search
  CPC .. F23R 2900/00015; F23C 2900/07001; F23C 7/004; F23D 11/24; F23D 14/02; F23Q 3/008; F05D 2240/32; F05D 2240/35
  See application file for complete search history.

(56) References Cited

U.S. PATENT DOCUMENTS

| | | | |
|---|---|---|---|
| 5,259,184 A | 11/1993 | Borkowicz et al. | |
| 5,394,688 A | 3/1995 | Amos | |
| 5,479,782 A | 1/1996 | Parker et al. | |
| 6,151,899 A | 11/2000 | Park | |
| 6,532,726 B2 | 3/2003 | Norster et al. | |
| 8,424,310 B2 * | 4/2013 | Syed | F23C 7/002 239/399 |
| 9,021,811 B2 * | 5/2015 | Lam | F23C 7/004 239/399 |
| 9,816,707 B2 * | 11/2017 | Dolmansley | F23R 3/343 |
| 2004/0177616 A1 * | 9/2004 | Buey | F02K 3/10 60/765 |
| 2008/0041060 A1 * | 2/2008 | Nilsson | F23R 3/14 60/737 |
| 2009/0025395 A1 * | 1/2009 | Nilsson | F23C 7/004 60/748 |
| 2009/0170043 A1 * | 7/2009 | Nilsson | F23D 11/443 431/246 |
| 2009/0272117 A1 | 11/2009 | Wilbraham | |
| 2010/0065663 A1 * | 3/2010 | Wilbraham | F23C 99/001 239/518 |
| 2010/0126176 A1 * | 5/2010 | Kim | F23C 7/006 60/748 |
| 2010/0293953 A1 * | 11/2010 | Wilbraham | F23R 3/14 60/737 |
| 2011/0113784 A1 * | 5/2011 | Headland | F02C 7/22 60/737 |
| 2012/0017595 A1 | 1/2012 | Liu | |
| 2012/0042655 A1 * | 2/2012 | Lam | F23C 7/004 60/737 |
| 2013/0273639 A1 * | 10/2013 | Nilsson | C11D 7/40 435/264 |
| 2014/0020397 A1 * | 1/2014 | Nilsson | F23M 5/025 60/772 |
| 2015/0316265 A1 * | 11/2015 | Dolmansley | F23Q 9/00 60/772 |

FOREIGN PATENT DOCUMENTS

| | | | | |
|---|---|---|---|---|
| CN | 101466980 A | 6/2009 | | |
| CN | 102062412 A | 5/2011 | | |
| CN | 102378878 A | 3/2012 | | |
| CN | 102414513 A | 4/2012 | | |
| EP | 2112433 A1 * | 10/2009 | | F23C 7/002 |
| GB | 2316162 A | 2/1998 | | |
| GB | 2444737 A | 6/2008 | | |
| WO | WO 2008071756 A1 * | 6/2008 | | F23R 3/14 |
| WO | 2010127682 A2 | 11/2010 | | |
| WO | WO 2012110315 A1 * | 8/2012 | | F23M 5/025 |
| WO | WO 2014090493 A1 * | 6/2014 | | F23R 3/343 |

\* cited by examiner

PILOT BURNER HAVING BURNER FACE WITH RADIALLY OFFSET RECESS

CROSS REFERENCE TO RELATED APPLICATIONS

This application is the US National Stage of International Application No. PCT/EP2015/050104 filed Jan. 6, 2015, and claims the benefit thereof. The International Application claims the benefit of European Application No. EP14154207 filed Feb. 6, 2014. All of the applications are incorporated by reference herein in their entirety.

FIELD OF INVENTION

The present invention is directed to a combustor and to a gas turbine engine comprising such a combustor.

BACKGROUND OF INVENTION

A typical gas turbine engine comprises an air inlet followed by a compressor section in which incoming air is compressed for application to one or more combustors of a combustor section of the gas turbine engine. A fuel, which may be a gaseous or liquid fuel, is introduced into the combustors and mixed with a part of the compressed air. Hot combustion gas created by combustion of the fuel/air mixture in the combustors is directed to a turbine section comprising a set of turbine blades and a set of turbine guide vanes. The combustion gas flowing against the turbine blades leads to a rotation of a shaft of the gas turbine engine to which the turbine blades are attached. As the blades of the compressor section are also attached to the shaft, a part of the mechanical power generated by the turbine section is used to operate the compressor section.

A combustor of a gas turbine engine usually comprises at least a burner, a swirler, and a combustion prechamber, which is adapted for a downstream fluid communication with a main combustion chamber. A usually planar burner face delimits the prechamber in the upstream direction.

The main purpose of the burner is to introduce fuel and air into the combustion prechamber, whereas a thorough mixing of the fuel and the air is necessary to obtain a stable and efficient combustion with good flame stability and the smallest possible amount of NOx emissions. Therefore, the combustor design must ensure that proper amounts of fuel are introduced in the right locations within the combustor, that these amounts of fuel are thoroughly mixed with air, and that thorough fuel vaporization takes place.

A swirler may be provided to achieve better mixing of fuel and air. A swirler comprises swirler vanes arranged in such a way that compressed air, which is guided through swirler slots being positioned between the swirler vanes, will be forced into a swirling movement around an axial centerline of the combustion prechamber. The swirling movement of the air enhances the mixing of the air with fuel.

In order to decrease the production of nitrogen oxides by gas turbine engines, use is made of so-called lean burn pre-mix combustors, in which the fuel to air ratio is reduced as far as possible in the higher operating ranges. Nevertheless, these lean fuel to air ratios are problematic with respect to maintaining flame stability when the engine load is reduced. It is known to incorporate a pilot fuel system into the burner, which will inject a supplemental amount of (pilot) fuel into the combustion prechamber in order to locally raise the fuel to air ratio.

Usually, the pilot fuel system is also used when starting the combustor. Fuel is injected from the pilot face towards the prechamber and ignited by an ignitor, which may be positioned somewhere within the pilot-burner face.

A combustor which comprises a pilot fuel system is disclosed in U.S. Pat. No. 6,151,899 A1, for example. The pilot fuel system comprises a nozzle for injecting pilot fuel into a combustion prechamber, the nozzle being situated within a central recess of a burner face at such a position and orientation that the fuel is injected substantially tangentially into the recess so as to flow around the peripheral wall thereof. For starting, the fuel is ignited by means of an electric spark ignitor, which may be situated in the pilot burner face.

An alternative positioning for pilot fuel injectors is disclosed in U.S. Pat. No. 6,532,726 B2. With the combustor disclosed therein, a single liquid lance arranged on the burner face.

Liquid pilot fuel is injected by means of the lance in the axial direction of the prechamber. Ignition of the fuel/air mixture is achieved by a spark ignition unit, which is positioned within the burner face as well.

In particular if such a combustor is run on liquid fuel a poor starting reliability may be encountered. This is the case, because ignition requires a sufficient amount of fuel/air mixture with a correct ratio to be present near the ignitor. Achieving this proves to be more difficult with liquid fuel than with gaseous fuel due to the worse mixing of liquid fuel and air compared to gaseous fuel.

SUMMARY OF INVENTION

The objective of the present invention is to provide a combustor for a gas turbine engine, which has a good starting reliability even with liquid fuel.

This objective is achieved by a combustor according to the claims. A gas turbine engine comprising such a combustor is also claimed. Further features and details of the invention are subject matter of the other claims and/or emerge from the description and the figures. Features and details discussed with respect to the combustor can also be applied to the gas turbine engine, and vice versa.

A combustor according to the invention comprises a burner, a combustion chamber, and a swirler being located radially outwardly of the combustion chamber and being adapted to impose a swirling motion on a fuel/air mixture about an axial centerline of the combustion chamber, and a burner face located radially inwardly of the swirler and forming an axially upstream wall of the combustion chamber, the burner face incorporating a pilot fuel injector and an ignitor, both being positioned radially offset from the axial centerline, whereas a recess is located radially offset within the burner face offset from the axial centerline.

The combustion chamber, which may be an axial flow combustion chamber, may comprise (in flow series) a combustion prechamber being located radially inwardly of the swirler and a main combustion chamber, which may have a larger cross-sectional area than the combustion prechamber.

The pilot fuel injector is advantageously adapted to inject (pilot) fuel into the combustion chamber in a direction (at least having a component) being parallel to the axial centerline.

Generally, the swirling flow of the fuel/air mixture has not only a circumferential component but also an axial component in the direction away from the burner face, into which the ignitor (which may be a spark ignitor) is integrated, thus resulting in a poor starting reliability of the combustor. The recess, which may have a circular shape, creates a local aerodynamic effect that drags the flow of fuel/air mixture towards the ignitor and thus enhances the starting reliability, because a sufficient amount of the fuel/air mixture will be dragged to the ignitor.

Advantageously, the recess is positioned between the pilot fuel injector and the ignitor with respect to a direction of rotation of a swirling motion about the axial centerline imparted onto air or a fuel/gas mixture by the swirler (which may require having air and/or main fuel nozzles incorporated within the swirler). Imparting such a swirling motion may be achieved by a swirler, which includes several swirler vanes arranged in a circular configuration and forming swirler slots in between, whereas the swirler slots have a chordal orientation with respect to a circle defined by the radial outer ends of the swirler vanes.

Directing the flow of fuel/air mixture to the ignitor may be particularly distinct, if the angular distance between the pilot fuel injector and the ignitor is between 145° and 225°, in particular between 165° and 195°, and more in particular about 180°.

Directing the flow of fuel/air mixture to the ignitor may be further enhanced, if (the center of) the recess and/or (the center of) the ignitor on the one hand and (the central injection axis of) the pilot fuel injector on the other hand are located at the same radial distance from the axial centerline of the combustion chamber.

Further, the angular distance between the pilot fuel injector and the recess may be smaller than the angular distance between the recess and the ignitor.

In an embodiment of the combustor according to the invention, the burner face is planar and thus does not comprise any elevation, which may disturb the swirling motion of the fuel/air mixture. This can be achieved if the pilot fuel injector and the ignitor are (fully) located in holes within the burner face.

In order to support mixing of the pilot fuel with air or fuel/air mixture entering the combustion chamber (coming from the swirler), the pilot fuel injector may be adapted to produce a cone shaped injection of pilot fuel and/or it may comprise a fuel duct (for the pilot fuel) and a compressed air duct. The pilot fuel may thus be mixed with compressed air also within the pilot fuel injector, which aids in atomizing the fuel and thus leads to a better mixing of fuel and air.

A gas turbine engine according to the invention is characterized by a (at least one) combustor according to the invention. Apart from the combustor, the gas turbine engine may comprise an air inlet, a compressor section, a turbine section, and an exhaust outlet. Air (or at least oxygen) entering the gas turbine engine via the air inlet may be compressed in the compressor section and then guided to the combustor(s). The compressed gas may be mixed with fuel and the fuel/air mixture burned within the combustor(s). The hot combustion gas may then be expanded within the turbine section, thereby creating mechanical power on a shaft of the gas turbine engine. The combustion gas may then be discharged from the gas turbine engine via the exhaust outlet.

BRIEF DESCRIPTION OF THE DRAWINGS

A specific embodiment of a gas turbine engine according to the invention will be explained in more detail with reference to the accompanying drawings. The drawings show in FIG. 1: the gas turbine engine in a longitudinal sectional view.

DETAILED DESCRIPTION OF INVENTION

The terms upstream and downstream refer to the flow direction of the air and/or combustion gas through the gas turbine engine unless otherwise stated. The terms forward and rearward refer to the general flow of gas through the gas turbine engine. The terms axial, radial and circumferential are made with reference to a rotational axis 20 of the gas turbine engine if not stated otherwise.

Figure 1:
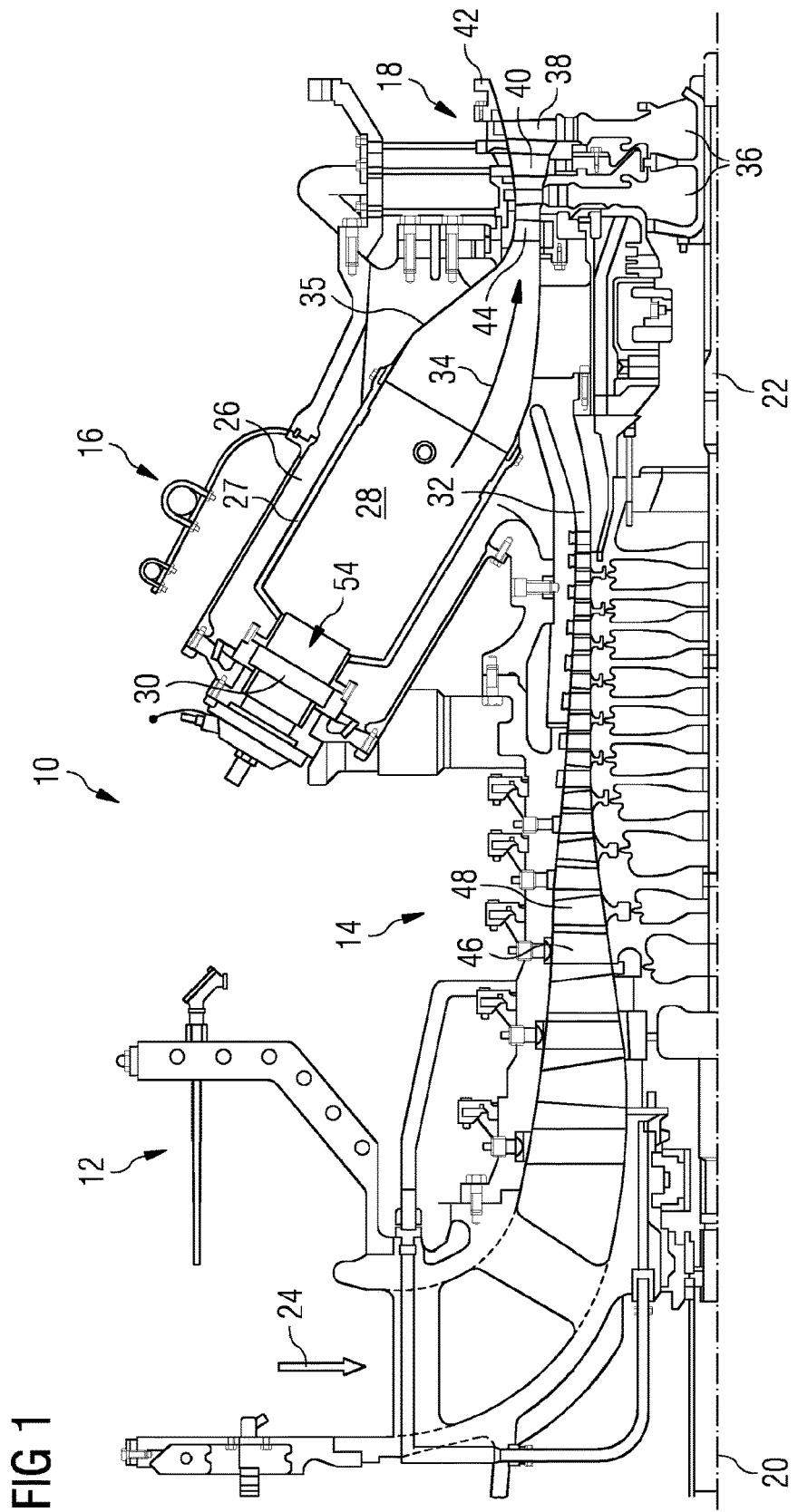

FIG. 1 shows an example of a gas turbine engine 10 according to the invention in a sectional view. The gas turbine engine 10 comprises, in flow series, an air inlet 12, a compressor section 14, a combustor section 16 and a turbine section 18, which are generally arranged in flow series and generally in the direction of the rotational axis 20 (which is also the longitudinal axis of the gas turbine engine 10). The gas turbine engine 10 further comprises a shaft 22, which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed within the compressor section 12 and delivered to the combustor section 16.

The compressor section 12 comprises axial series of guide vane stages 46 and rotor blade stages 48.

The combustor section 16 comprises a burner plenum 26, one or more main combustion chambers 28 defined by a double wall can 27 and at least one burner 30 fixed to each main combustion chamber 28. The main combustion chambers 28 and the burners 30 are located inside the burner plenum 26.

The compressed air passing through the compressor section 12 enters a diffuser 32 and is discharged from the diffuser 32 into the burner plenum 26 from where a part of the air enters the burners 30 and is mixed therein with a gaseous or liquid fuel. The fuel/air mixture is then burned and the combustion gas 34 is channeled via a transition duct 35 to the turbine section 18.

The turbine section 18 comprises a number of blade carrying discs 36 attached to the shaft 22. In the present embodiment, two discs 36 each carry an annular array of turbine blades 38. However, the number of blade carrying discs 36 could be different, i.e. only one disc 36 or more than two discs 36.

In addition, guiding vanes 40, which are fixed to a stator 42 of the gas turbine 10, are disposed between the turbine blades 38. Between the exit of the main combustion chamber 28 and the leading turbine blades 38 inlet guiding vanes 44 are provided.

The combustion gas from the main combustion chamber 28 enters the turbine section 18 and drives the turbine blades 38, which in turn rotate the shaft 22. The guiding vanes 40, 44 serve to optimize the angle of the combustion gas on to the turbine blades 38.

Figure 2:
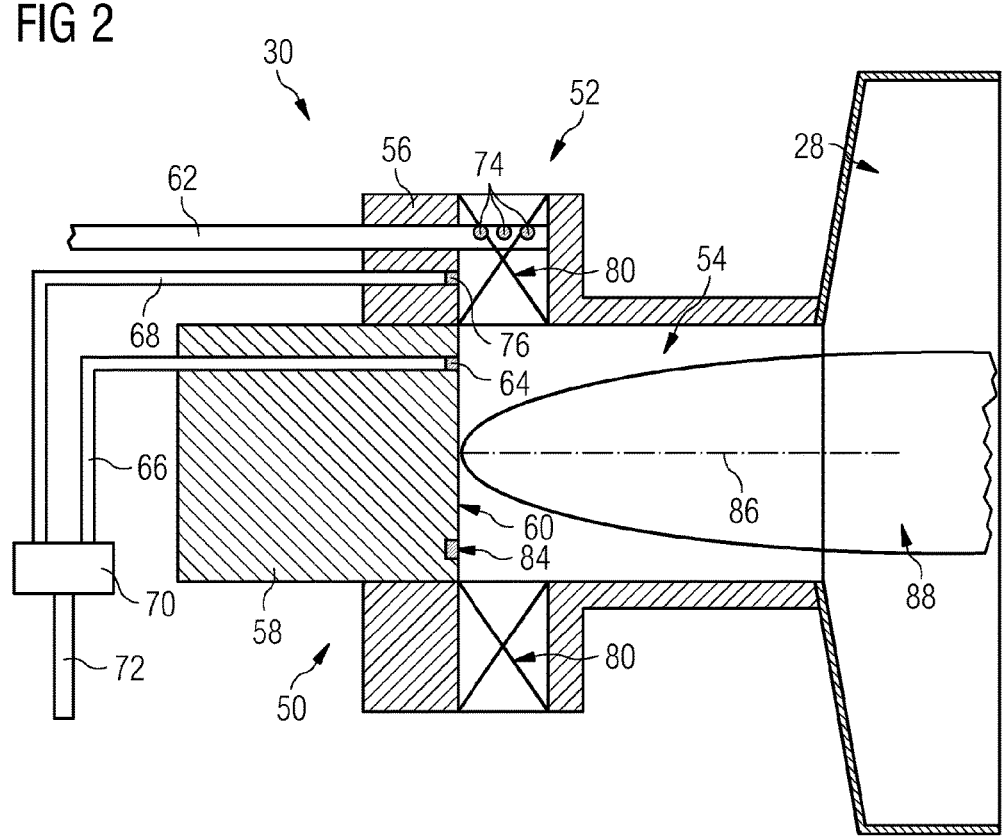
FIG. 2: the general structure of the combustor of the gas turbine engine.

As shown schematically in FIG. 2, the burner 30 of the gas turbine engine 10 comprises a burner section 50, a swirler 52, and a combustion prechamber 54, which is connected to the main combustion chamber 28. The burner section 50 comprises a main burner 56 and a pilot burner 58. The swirler 52 is arranged radially outwardly of (an upstream section of) the combustion prechamber 54. A pilot burner face 60 of the pilot burner 58 forms an axially upstream wall of the combustion prechamber 54. Main gaseous fuel may be introduced into the swirler 52 through a gas fuel supply 62 of the main burner 56. Main liquid fuel may be introduced into the swirler 52 through a liquid fuel supply 68, while liquid pilot fuel may enter the combustion prechamber 54 through a pilot fuel injector 64 (lance) of a pilot fuel supply 66 of the pilot burner 58.

The flows of liquid main fuel and pilot fuel are separated by a fuel-split valve 70, which is connected to a common fuel supply 72. The flow of gaseous fuel may enter the swirler 52 through a set of gas fuel nozzles 74 being in fluid communication with the gas fuel supply 62. Main liquid fuel may enter the swirler 52 through main liquid fuel nozzles 76 being in fluid communication with the liquid fuel supply 68. Either one of the fuel is then guided along swirler vanes 80 while being mixed with compressed air. The resulting fuel/air mixture is burned within the combustion prechamber 54, whereas a flame 88 is created, residing about centrally within the combustion prechamber 54 and stabilizing on the pilot burner face 60. The flame 88 reaches into the main combustion chamber 28.

Figure 3:
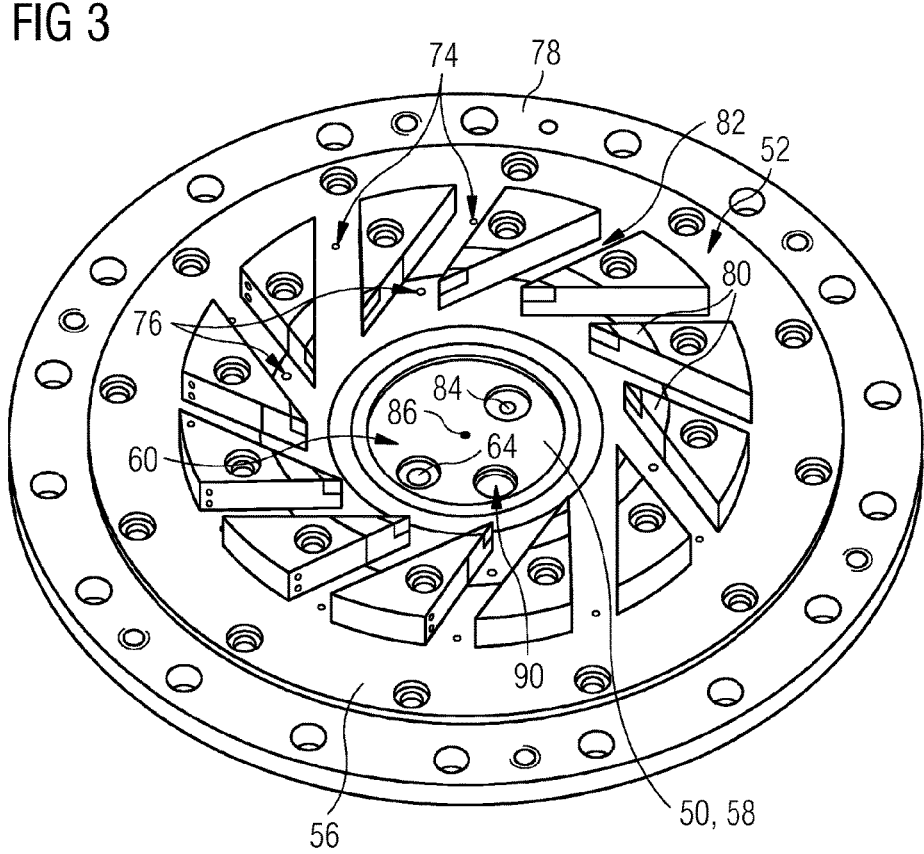
FIG. 3: a detailed perspective view of an assembly of the burner of the gas turbine engine.

FIG. 3 shows a perspective view of an assembly comprising the burner section 50, the swirler 52, and an adapter plate 78, as viewed from the combustion prechamber 54 of the burner 30. The adapter plate 78 is used to attach the combustor 30 to the burner plenum 26. Attached to the adapter plate 78 is the swirler 52, which includes several swirler vanes 80 arranged in a circular configuration. The swirler vanes 80 have a triangular shape. Between pairs of neighboring swirler vanes 80 swirler slots 82 are formed, which have a chordal orientation with respect to a circle defined by the radial outer faces of the swirler vanes 80. Main liquid fuel nozzles 76 are integrated into the main burner 56, situated between every second pair of the swirler vanes 80. All of the main liquid fuel nozzles 76 are in fluid communication with the liquid fuel supply 68, which is not shown in FIG. 3, but similar to the liquid fuel supply 68 as shown schematically in FIG. 2.

Further, gas fuel nozzles 74 are integrated into the main burner 56, situated between each pair of the swirler vanes 80. All gas fuel nozzles 74 are in fluid communication with a gas fuel supply 62 similar as shown schematically in FIG. 2.

Either main liquid fuel or gaseous fuel may be injected into the combustion prechamber 54 by means of the main liquid fuel nozzles 76 or the gas fuel nozzles 74. The fuel will be mixed with compressed air and the resulting fuel/air mixture forced into a swirling motion about the axial centerline 86 by the swirler 52.

The pilot burner 58 of the burner section 50 is positioned radially inwards of the swirler 52, of which only the pilot burner face 60 can be seen in FIG. 3. The pilot fuel injector 64 is positioned within a first hole of the pilot burner face 60. The pilot fuel injector 64 is in fluid communication with the pilot fuel supply 66 as shown schematically in FIG. 2. An ignitor 84, e.g. a spark ignitor, is positioned within a second hole of the pilot burner face 60. The two holes encompassing the pilot fuel injector 64 and the ignitor 84 are both positioned radially offset from an axial centerline 86 of the combustion prechamber 54 with about the same radial distances from the axial centerline 86. These distances are chosen to position the pilot fuel injector 64 and the ignitor 84 radially outwards of the area where the flame 88 is residing on the pilot burner face 60. The angular distance between the two holes is about 180°, i.e. they are lying about opposite each other with respect to the axial centerline 86 of the combustion prechamber 54. A circular recess 90 (respectively hole) is integrated into the pilot burner face 60 radially offset from the axial centerline 86 with about the same distance as the two holes. The recess 90 is thus positioned between the pilot fuel injector 64 and the ignitor 84 in the circumferential direction about the axial centerline 86 of the combustion prechamber 54, whereas the angular distance between the recess 90 and the pilot fuel injector 64 is smaller than the angular distance between the recess 90 and the ignitor 84.

Figure 4:
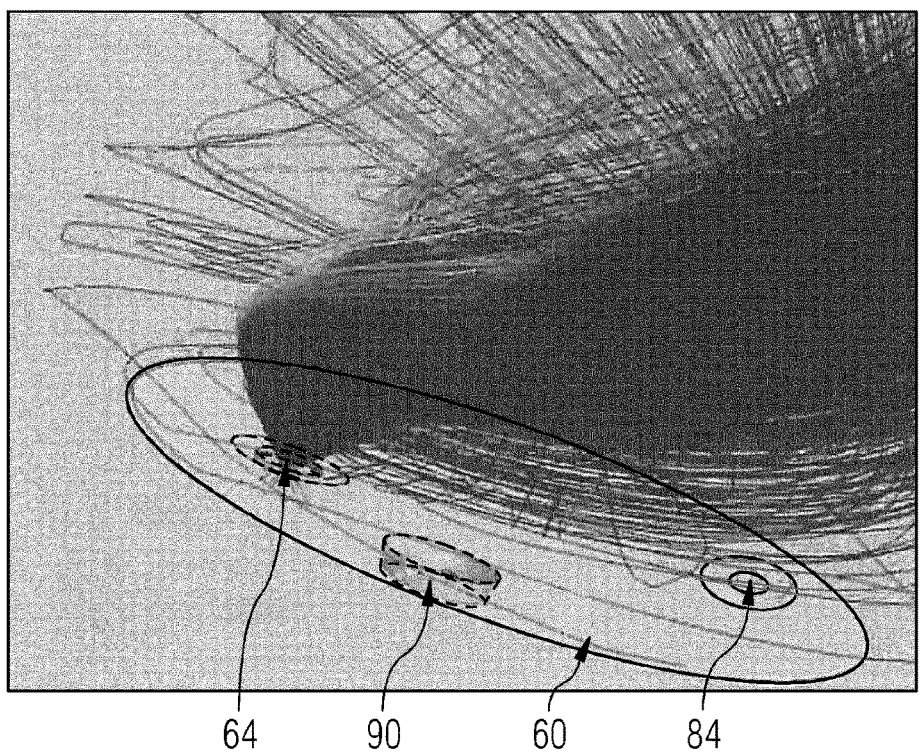
FIG. 4: a schematic diagram of the flow of pilot fuel injected into the combustion prechamber by the pilot fuel injector of the combustor.
Figure 5:
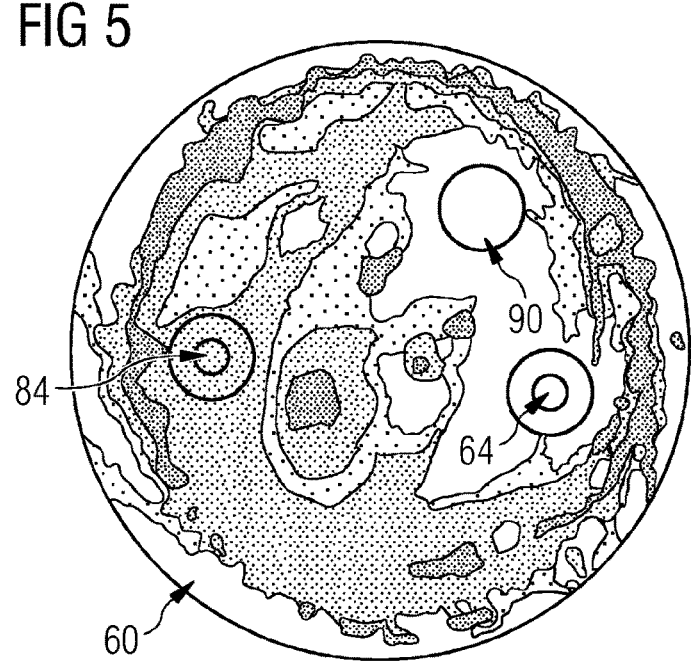
FIG. 5: a schematic diagram of the distribution of droplets of pilot fuel impinging a pilot burner face of the combustor.

The recess 90 has a local aerodynamic effect on the swirling flow of the fuel/air mixture within the combustion prechamber 54. Due to a relative low pressure created by the recess 90, tiny droplets of pilot fuel injected by the pilot fuel injector 64 into the combustion prechamber 54 are drawn in the direction of the pilot burner face 60. This leads in combination with the specific configuration of the pilot fuel injector 64, the ignitor 84, and the recess 90 to a relative large amount of droplets of pilot fuel impinging on the pilot burner face 60 in the area of the ignitor 84 and thus to good starting conditions for the burner 30. FIGS. 4 and 5 illustrate the local aerodynamic effect and the achieved advantageous distribution of the droplets of pilot fuel impinging on the pilot burner face 60. While in FIG. 5 the part of the pilot burner face 60 surrounding the pilot fuel injector 64 and the recess 90 is exposed to only a small amount of pilot fuel, most of the other part of the pilot burner face 60, including the hole incorporating the ignitor 84, is exposed to a substantially larger amount of pilot fuel.

The invention claimed is:

1. A burner comprising:
   a pilot burner, a combustion chamber, and a swirler located radially outwardly of the combustion chamber and being adapted to impose a swirling motion on a fuel/air mixture about an axial centerline of the combustion chamber,
   wherein the pilot burner comprises a pilot burner face located radially inwardly of the swirler and forming an axially upstream wall of the combustion chamber, the pilot burner face incorporating a pilot fuel injector and an ignitor, both being positioned radially offset from the axial centerline, and a recess being positioned radially offset from the axial centerline within the pilot burner face, the recess having a center that is remote from the axial centerline and being spaced apart from the pilot fuel injector and the ignitor, the recess comprising a depression in the pilot burner face configured to create a local aerodynamic effect on the swirling motion of the fuel/air mixture effective to draw droplets of fuel in the fuel/air mixture toward the ignitor.

2. The burner according to claim 1,
   wherein the recess is positioned between the pilot fuel injector and the ignitor with respect to a direction of rotation of the swirling motion about the axial centerline, imparted onto the fuel/air mixture by the swirler.

3. The burner according to claim 1,
   wherein an angular distance between the pilot fuel injector and the ignitor is between 145° and 225°.

4. The burner according to claim 1,
wherein at least one of the recess and the ignitor is located at a same radial distance from the axial centerline as the pilot fuel injector.

5. The burner according to claim 1,
wherein an angular distance between the pilot fuel injector and the recess is smaller than an angular distance between the recess and the ignitor.

6. The burner according to claim 1,
wherein the pilot burner face is planar with the pilot fuel injector and the ignitor being located in holes of the pilot burner face.

7. The burner according to claim 1,
wherein the recess has a circular shape.

8. A gas turbine engine comprising
a burner according to claim 1.

9. The burner according to claim 1,
wherein an angular distance between the pilot fuel injector and the ignitor is between 165° and 195°.

10. The burner according to claim 1,
wherein an angular distance between the pilot fuel injector and the ignitor is 180°.

11. A gas turbine engine burner comprising:
a combustion chamber partially defined by a burner face;
a fuel injector and an ignitor disposed proximate the burner face and remote from an axial centerline of the combustion chamber;
a swirler adapted to impose a swirling motion on a fuel/air mixture about the axial centerline within the combustion chamber, and
the burner face comprising a recess spaced apart from the fuel injector, the ignitor and the axial centerline, the recess having a center that is remote from the axial centerline, wherein the recess is configured to create a relative low pressure region in the swirling fuel/air mixture effective to draw droplets of fuel in the fuel/air mixture toward the ignitor.

12. The gas turbine engine burner of claim 11, wherein respective centers of the recess, the fuel injector and the ignitor are all located at a same radial distance from the axial centerline.

13. The gas turbine engine burner of claim 12, wherein an angular distance between the center of the fuel injector and the center of the recess is smaller than an angular distance between the center of the recess and the center of the ignitor.

* * * * *